United States Patent [19]

Moro et al.

[11] Patent Number: 4,706,570

[45] Date of Patent: Nov. 17, 1987

[54] CRANE WITH ANTI-SKEWING DEVICE

[75] Inventors: Dominik J. Moro, Mt. Wolf; Robert R. Reisinger, York; James M. Larson, York; Roscoe E. Kuhn, York, all of Pa.

[73] Assignee: Acco Babcock Inc., Fairfield, Conn.

[21] Appl. No.: 756,388

[22] Filed: Jul. 17, 1985

[51] Int. Cl.[4] .......................... B61D 1/00; E04G 3/14; B66C 11/02; H02P 5/46

[52] U.S. Cl. .................................. 105/163.2; 105/148; 182/19; 182/36; 212/206; 212/149; 212/159; 212/171; 212/153; 318/68; 318/318

[58] Field of Search ........ 212/146, 147, 149, 153–154, 212/213–218, 157, 159, 170–171, 205–206, 207, 212; 340/685; 105/163.5 K, 163.2, 148; 318/7, 55, 66–68, 71, 78, 110, 255, 262, 265, 336–337, 341, 369; 182/36, 19

[56] References Cited

U.S. PATENT DOCUMENTS

| | | | |
|---|---|---|---|
| 1,181,324 | 5/1916 | Lent | 105/163.5 K |
| 1,198,409 | 9/1916 | Berghoefer | 212/218 |
| 1,355,774 | 10/1920 | Payne | 105/163.5 K |
| 1,752,026 | 3/1930 | Phillips | 212/205 |
| 3,262,580 | 7/1966 | Markowitz | 212/213 |
| 3,447,050 | 5/1969 | Geis | 318/68 |
| 3,703,016 | 11/1972 | Schramm et al. | 105/163.5 K |
| 3,972,779 | 2/1974 | Brazell | 212/213 |
| 4,358,020 | 11/1982 | Thiele | 212/153 |
| 4,538,096 | 8/1985 | Kern | 318/318 |

FOREIGN PATENT DOCUMENTS

| | | | |
|---|---|---|---|
| 137433 | 9/1979 | German Democratic Rep. | 105/163.5 K |
| 974700 | 11/1964 | United Kingdom | 212/153 |
| 253328 | 10/1970 | U.S.S.R. | 212/153 |

*Primary Examiner*—Joseph F. Peters, Jr.
*Assistant Examiner*—R. B. Johnson
*Attorney, Agent, or Firm*—Barnes, Kisselle, Raisch, Choate, Whittemore & Hulbert

[57] ABSTRACT

A crane with an anti-skewing device comprising a platform suspended under a bridge deck by two end truck assemblies supported by runways on a bridge. Each end truck assembly includes two sets of trolleys and an upper load bar interconnects the two sets of trolleys. A lower load bar is suspended from the upper load bar by a kingpin for rotation about a vertical axis. Hinge tubes support the platform on the suspension assembly for pivotal movement in a direction lengthwise of the platform. Each end truck assembly is driven by a variable speed motor. As skewing occurs a mechanical sensing mechanism senses relative movement between lower load bar and the upper load bar and provides a signal to an electronic circuit causing one or both of the motors associated with the end truck assembly on which the sensing mechanism is mounted to increase or decrease the speed of the motor and thereby correct the skew.

7 Claims, 14 Drawing Figures

CRANE WITH ANTI-SKEWING DEVICE

This invention relates to cranes and particularly to anti-skewing devices associated with cranes.

BACKGROUND AND SUMMARY OF THE INVENTION

In crane construction which comprises opposed pairs of end truck assemblies movable along a track and a long transverse support member between the end truck assemblies, it is common for skewing to occur wherein one end truck assembly gets ahead of or behind of the end truck assembly on the other side of the crane. This skew condition creates horizontal or lateral forces to be induced into the runway or track system on which the crane is operating. On most overhead or industrial cranes, the forces caused by this skewing action can be handled by the runway system or are not significant due to the short travel distances of the crane in the system. However, where cranes are utilized for maintenance platforms under a bridge to traverse a span of the bridge, the operation of the crane will be along a considerable length and a skew condition will increase and induce forces of damaging magnitude on the structure of the bridge.

In one type of maintenance platform that has been proposed, the platform utilized wound rotor motors which resulted in a runaway condition as the platform operated down the slope of the bridge.

In U.S. Pat. No. 4,505,207, an anti-skewing device for a bridge crane comprises a proximity switch near a first side of a first track and near a first end of the crane for detecting the proximity of the switch to the first side of the first track and thereby any skewing of the crane. There is an electrically activated brake for each set of wheels. A circuit connects the proximity switch to each of the brakes to slow one end of the crane relative to another end and thereby correct any skewing during movement of the crane.

Among the objectives of the present invention are to provide a crane with an anti-skewing device which will function to correct the skewing; which is relatively simple and inexpensive in construction; which requires minimum maintenance; and which is reliable.

In accordance with the invention; a crane with an anti-skewing device comprises a platform suspended under a bridge deck by two end truck assemblies supported by runways on a bridge. Each end truck assembly includes two sets of trolleys and an upper load bar laterally interconnects the two sets of trolleys. A lower load bar is suspended from the upper load bar by a kingpin for rotation about a vertical axis. Hinge tubes support the platform on the suspension assembly for pivotal movement in a direction lengthwise of the platform. Each end truck assembly is driven by a variable speed motor. As skewing occurs a mechanical sensing mechanism senses relative movement between the lower load bar and the upper load bar and provides a signal to an electronic circuit causing one or both of the motors associated with the end truck assembly on which the sensing mechanism is mounted to increase or decrease the speed of the motor and thereby correct the skew.

DESCRIPTION

Figure 1:
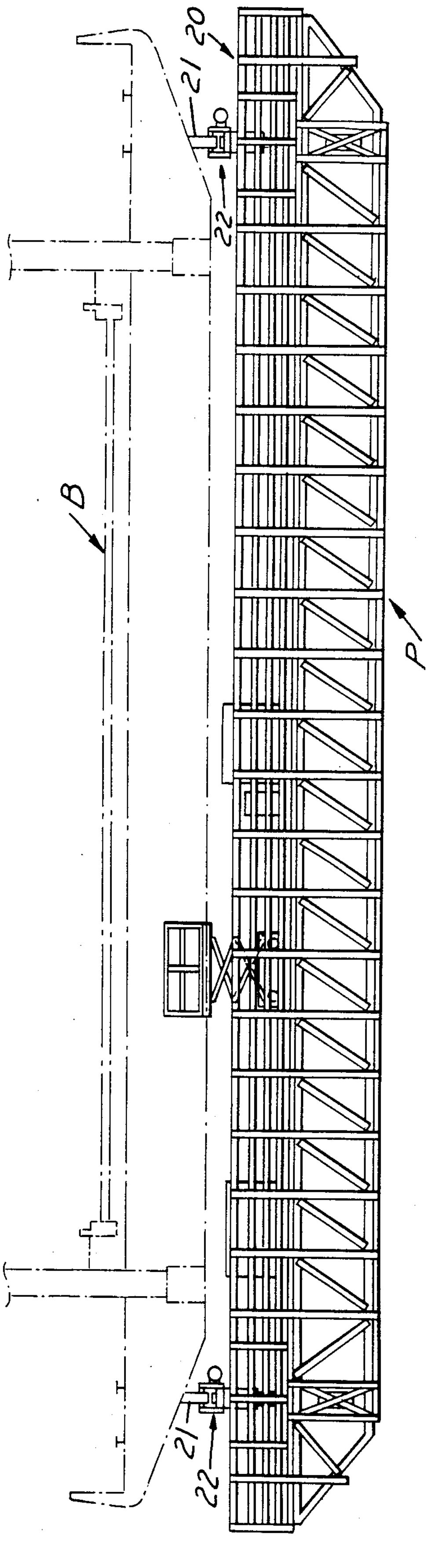
FIG. 1 is an end view of the crane embodying the invention.

Referring to FIG. 1, the crane 20 embodying the invention is shown in association with a bridge B and includes a platform P suspended below the stationary bridge B for movement along spaced tracks or runways 21 by suspension assemblies or end truck assemblies 22. In a typical example, the platform may have a length of over 100 feet and may be movable along a span of the bridge of 1750 feet.

Figure 2:
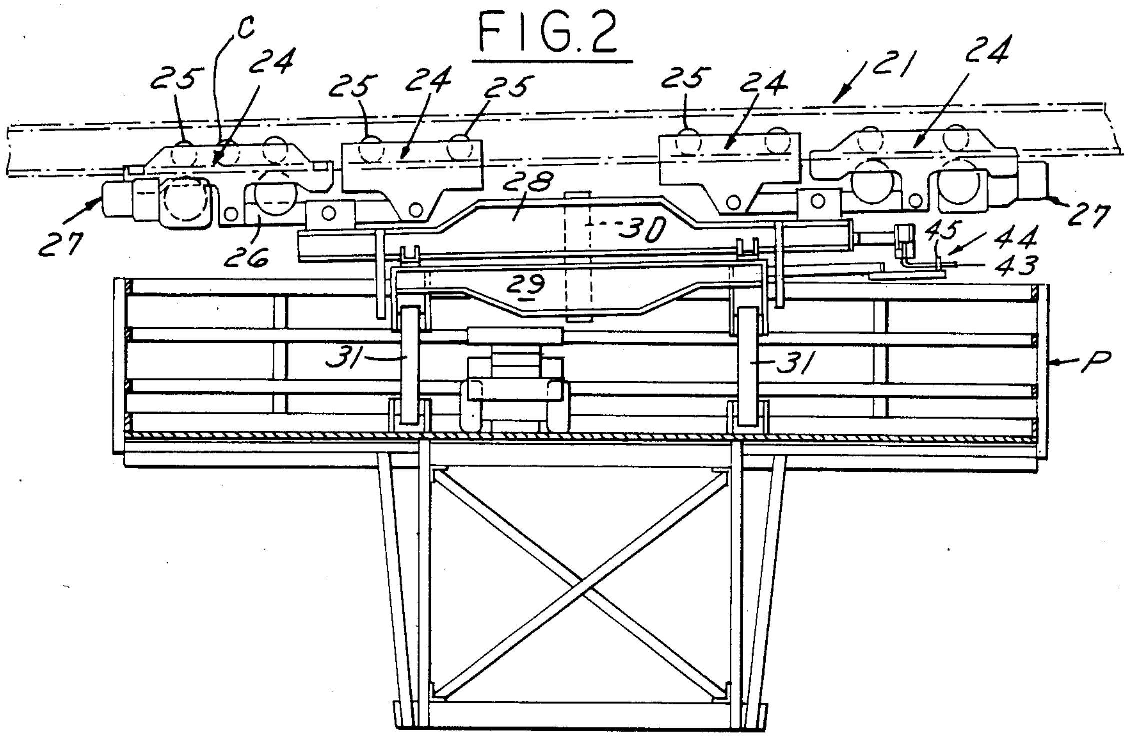
FIG. 2 is a side view of the crane.
Figure 3:
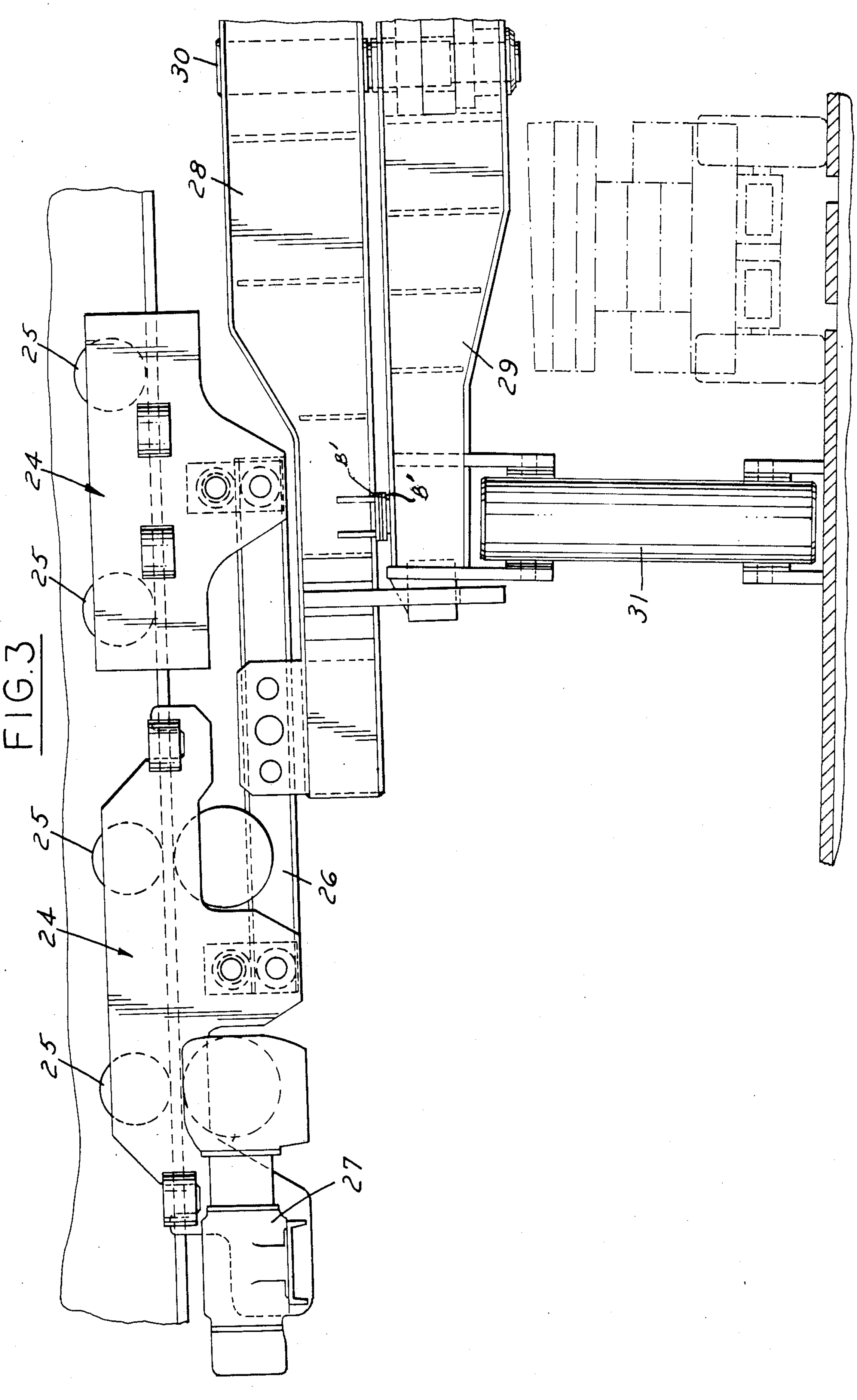
FIG. 3 is a fragmentary part sectional view of a portion of the suspension assembly of the crane.
Figure 4:
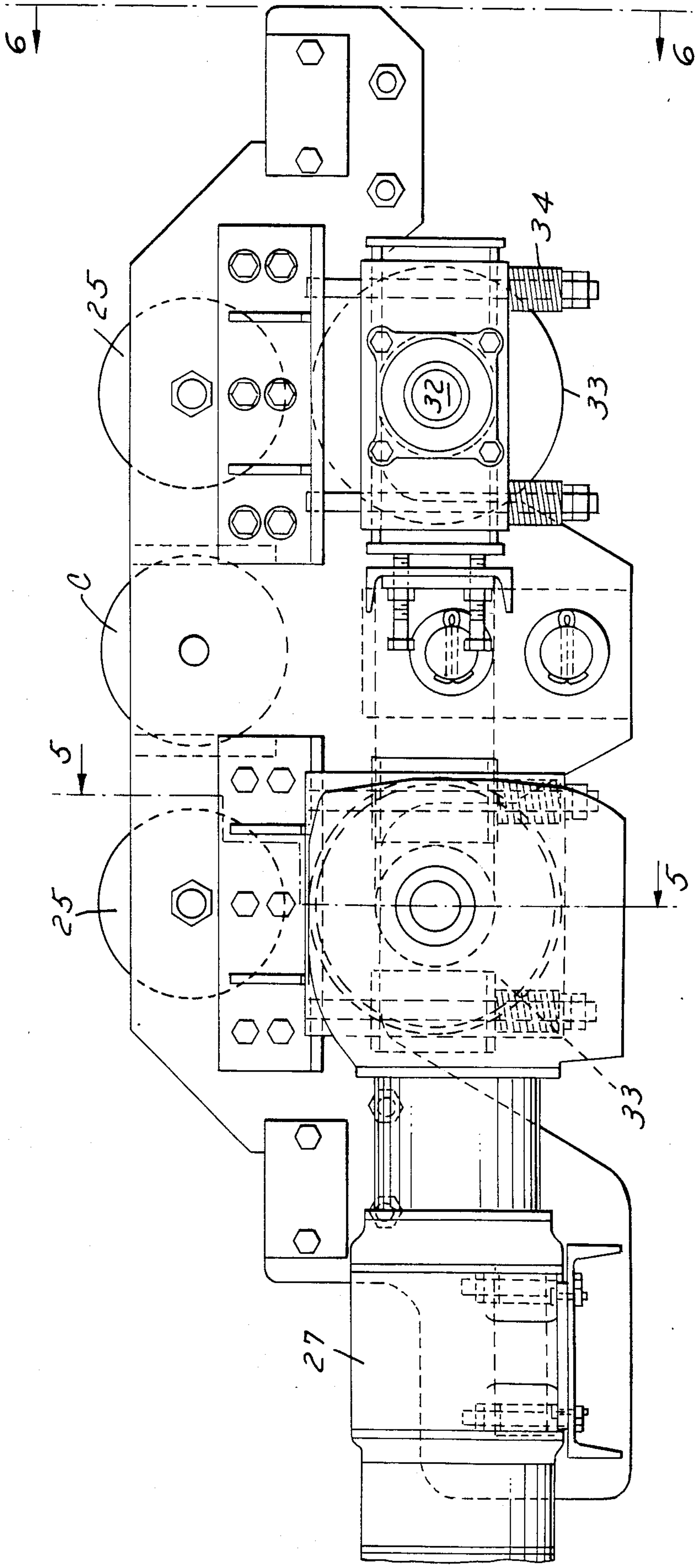
FIG. 4 is a fragmentary view on an enlarged scale of the portion of the suspension assembly shown in FIG. 3.
Figure 5:
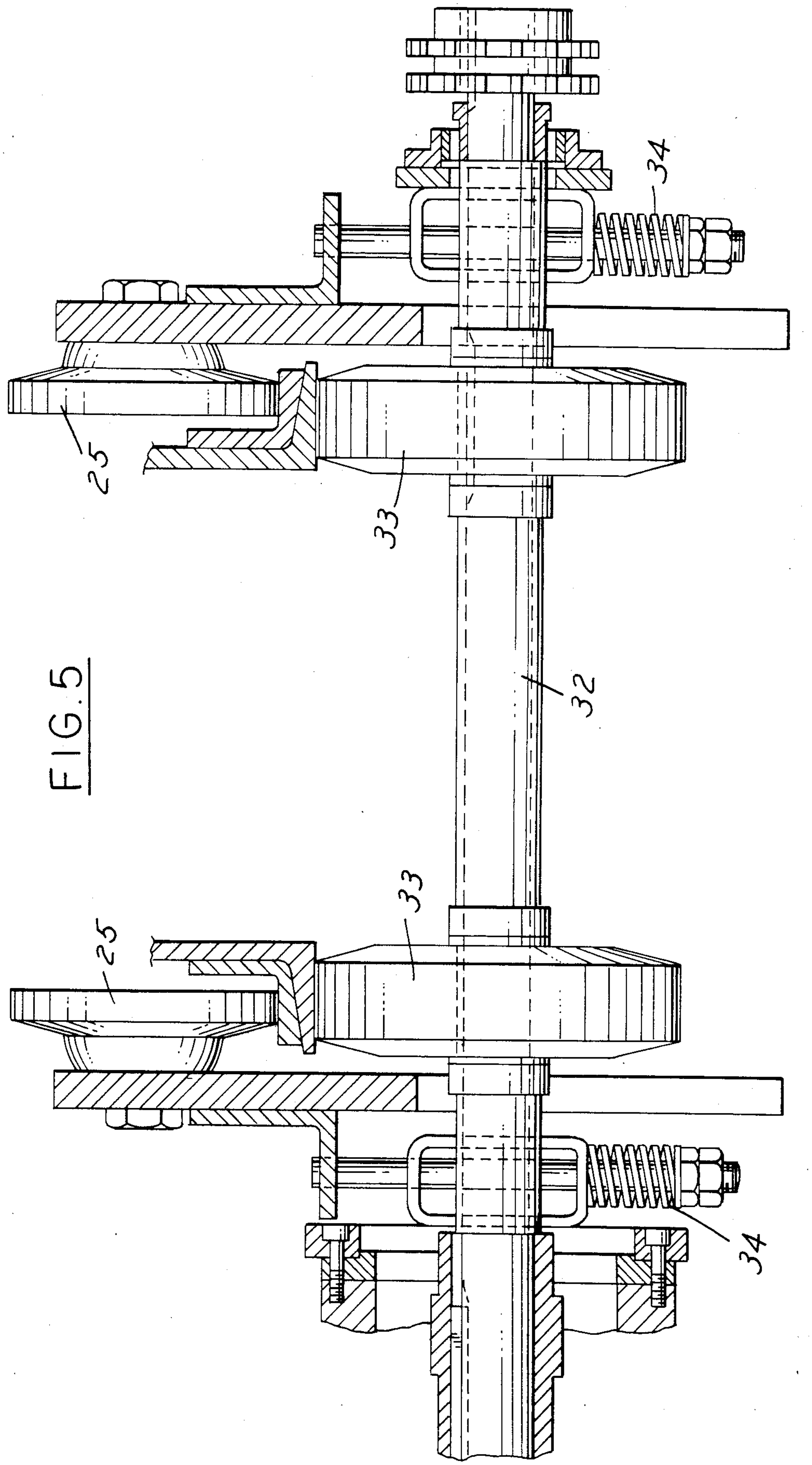
FIG. 5 is a sectional view taken along the line 5—5 in FIG. 4.
Figure 6:
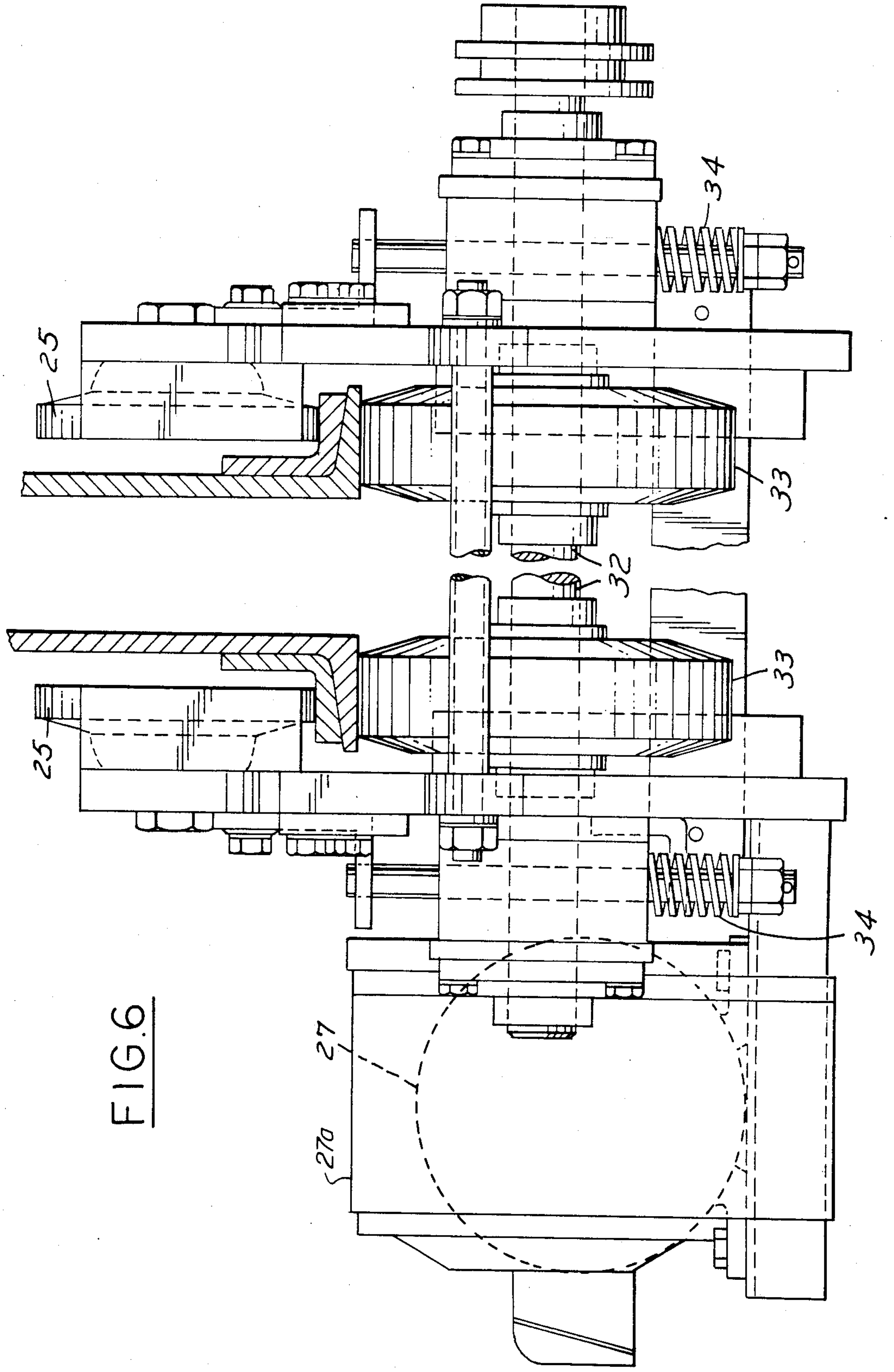
FIG. 6 is a sectional view taken along the line 6—6 in FIG. 4.

Referring to FIG. 2, each suspension assembly 22 comprises two sets of trolleys 24 having wheels 25 for engaging the flange of a track 21. Each pair of trolleys 24 is interconnected by a tie bar 26 and a variable speed motor 27 is associated with one set of trolleys. The tie bars are interconnected by an upper load bar 28 and a lower load bar 29 is pivoted about a vertical axis to the upper load bar 28 by a kingpin 30. The platform P is suspended from the lower load bar 29 by tubular shafts 31 for limited pivotal movement in a direction lengthwise of the platform P. Bearing pads B are interposed between the load bars (FIG. 3).

Referring to FIGS. 3–6, the trolley which supports the motor includes a shaft 32 driven by the motor 27 through a gear box 27*a* and drive tires 33 on the shaft engaging the underside of the track. Springs 34 yieldingly urge the tires 33 upwardly against the underside of the flange holding the trolley against the rollers 25.

Figure 7:
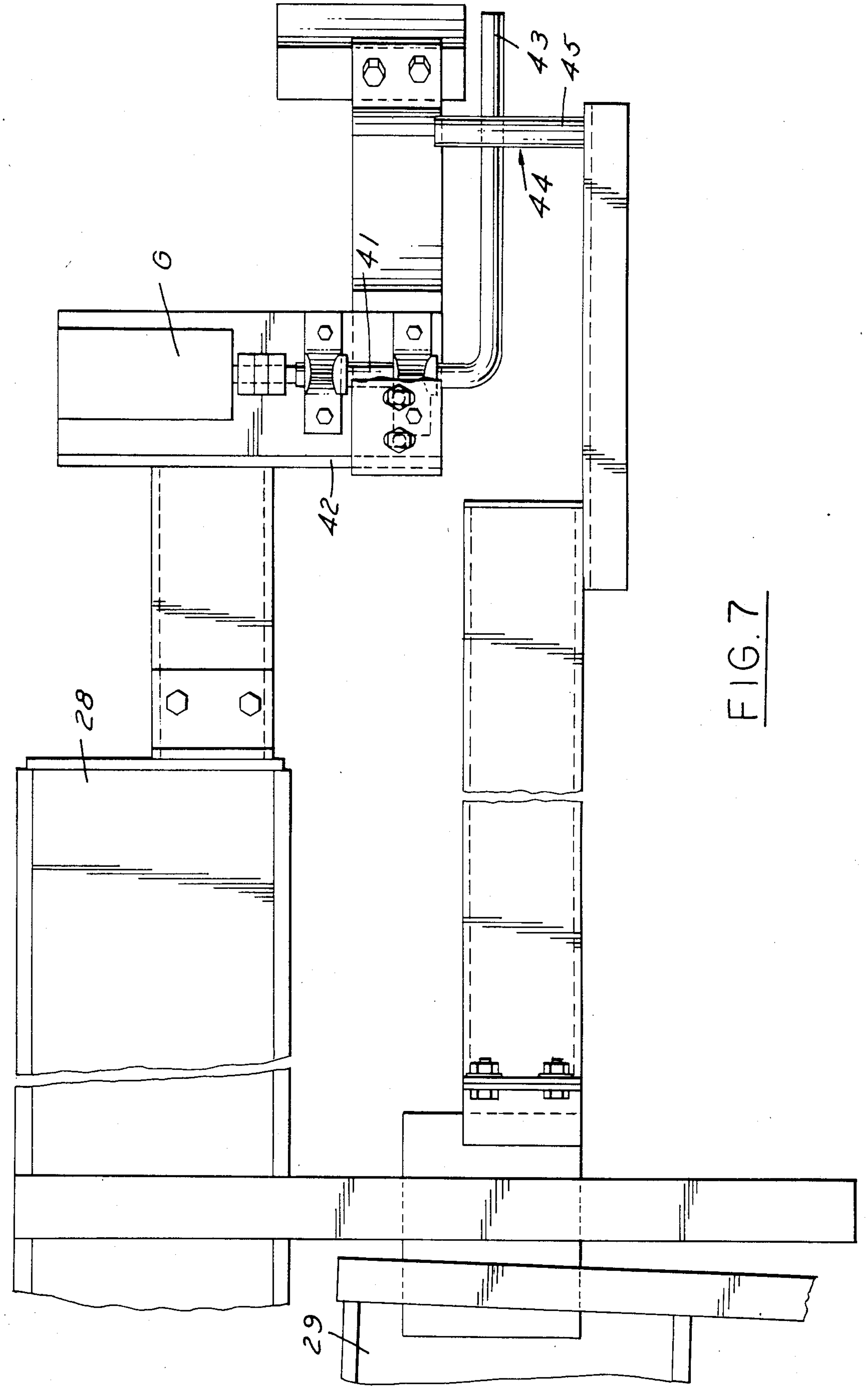
FIG. 7 is a fragmentary elevational view of a portion of one of the suspension assemblies.
Figure 8:
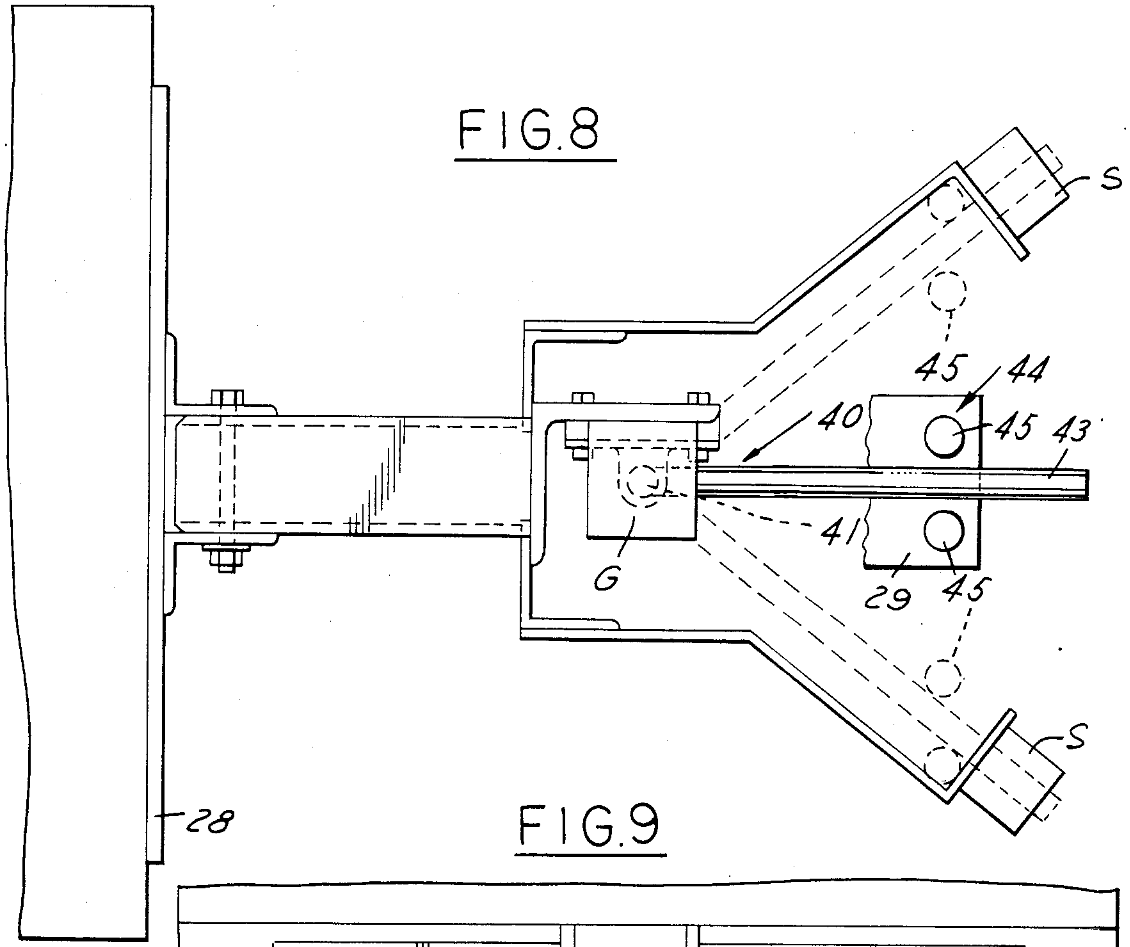
FIG. 8 is a fragmentary plan view of the suspension assembly shown in FIG. 7.
Figure 9:
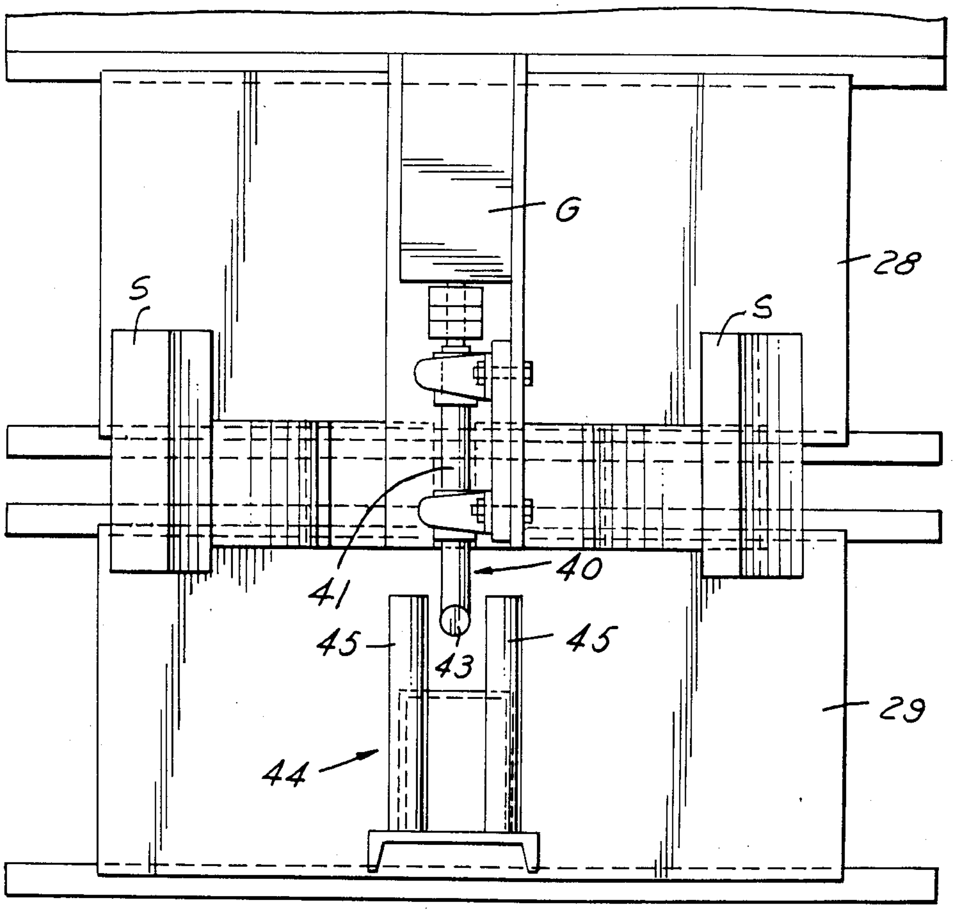
FIG. 9 is a end view of the suspension assembly shown in FIG. 8.

Referring to FIGS. 7–9, an anti-skewing device is provided and comprises an L-shaped bar 40 which has a vertical portion 41 rotatably mounted in a bracket 42 which in turn is mounted on the upper load bar 28. The L-shaped bar 40 includes a horizontal portion 43 which projects between a fork 44 formed by upwardly extending vertical bars 45 on the lower load bar. The vertical portion 41 of the L-shaped bar 40 is connected to a rotary pulse generator G so that rotation thereof produces a pulse signal.

As skewing action occurs, regardless which end truck assembly 22 gets ahead of the other end truck assembly 22, the trolley and upper load bar 28 will remain parallel with the runway track. As the one load bar 28 and end truck assembly 22 gets ahead of the other load bar and the truck assembly 22 at the other side of the crane, the lower load bars 29 and platform P will pivot relative to the upper load bars 28 at the kingpin 30. The relative difference in angular movement between the upper load bar 28 and lower load bar 29 is used as a means to detect the amount of skew that is permissible. As the lower load bar 29 rotates under the upper load bar 28, the fork 44 will move relative to the L-shaped bar 41 and produce pulses which indicate the amount of skew.

When the skew reaches a point when the skew is to be limited, a signal will be fed back into an overall control system which in turn will cause the variable speed motor 27 associated with one of the end truck suspension assemblies to increase or decrease its speed and correct the skew.

As shown in FIGS. 8 and 9, proximity switches S are provided at the extremity of abnormal skew movement of horizontal portion 43 of bar 40 to provide a signal to shut-off all power to the system.

Figure 8A:
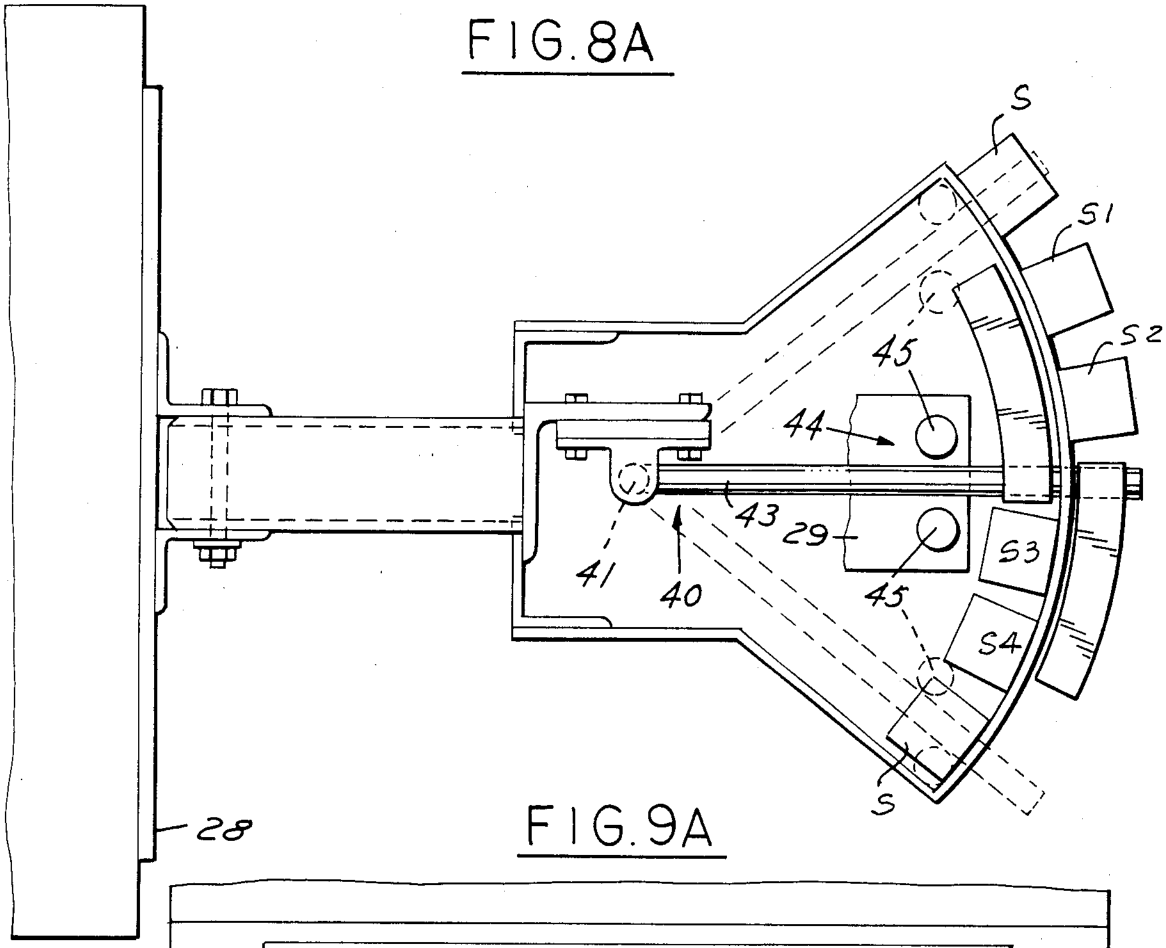
FIGS. 8A and 9A are views corresponding to FIGS. 8 and 9 of a modified form of crane embodying the invention.
Figure 9A:
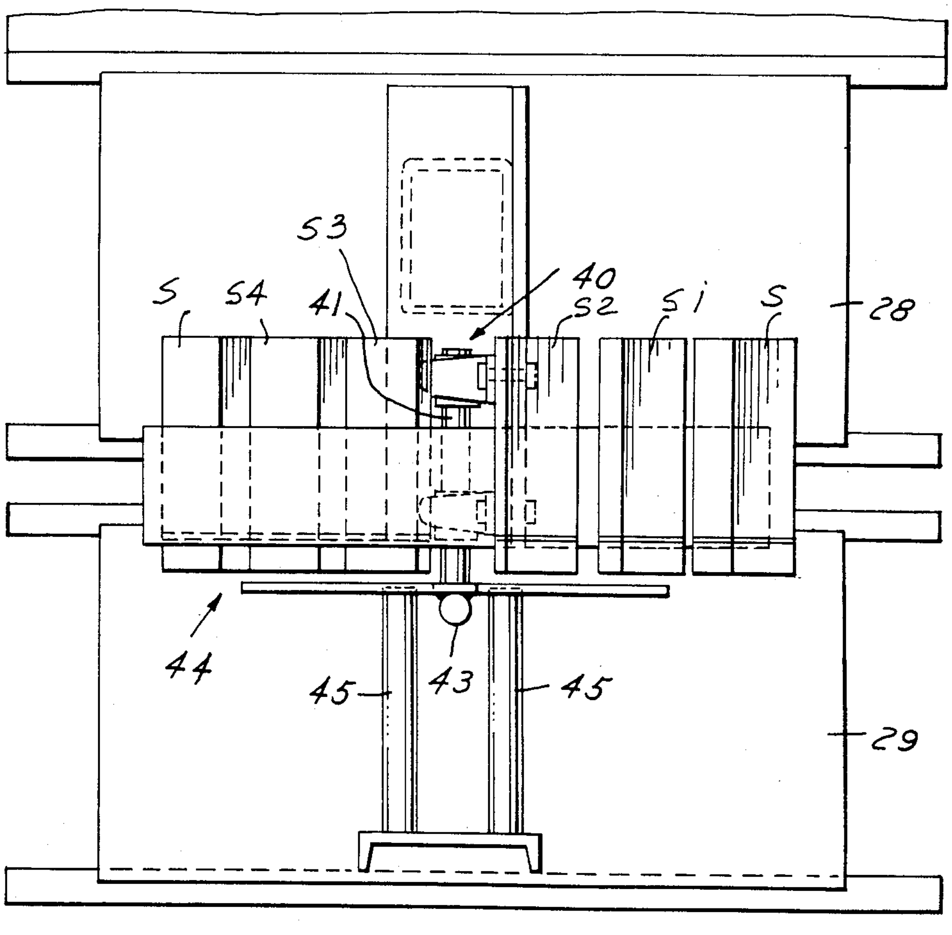

In the form shown in FIGS. 8A and 9A, in lieu of a rotary pulse generator G, a series of proximity switches 5, 51, and 52, 53, 54 may be provided along the path of portion 43 to provide a signal of angular skew.

In a preferred form, the variable speed motor comprises an electric inverter drive motor which operates in relation to the frequency of the electrical power, changing speeds with changes or variations in frequency. Such motors are applied on both end truck assemblies so that the electric control system can function to control and vary the frequency of one or both. Alternatively, other types of variable speed motors may be used such as variable speed hydraulic motors.

Figure 10:
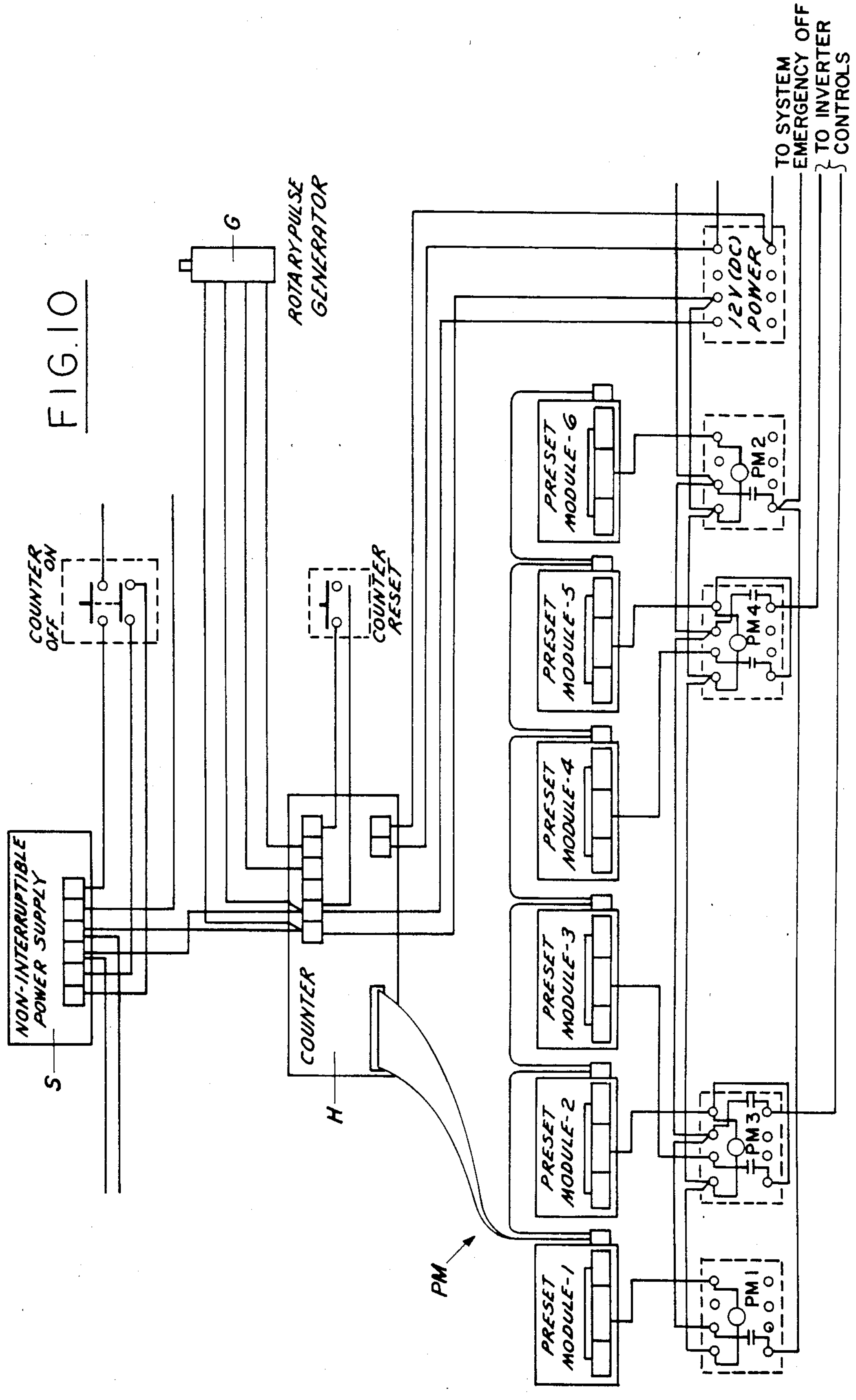
FIG. 10 is an electrical diagram of the control system.

Referring to FIG. 10, rotary skew pulse generator G is rotated clockwise or counterclockwise by the L-shaped bar 41 (FIG. 7) at any time a skew condition exists. Each degree of skew causes the rotary pulse generator to transmit, for example, 3.33 pulses to the counter. The pulse generator has a quadrature output consisting of two pulse trains, one of which is 90° (electrical) out of phase with the other. By virtue of this arrangement, the direction of motion can be determined. The counter H will accept this quadrature type signal. Depending on the rotation of the pulse generator (clockwise or counter-clockwise) the counter will count up and down, positive or negative, from zero position. Zero position being when the platform is 90° in relationship to the rails. The present modules accept this count. Preset modules 1, 2 and 3 accept the negative count. Preset modules 4, 5 and 6 accept the positive count. Preset modules continually read the counter. Preset module 1 is preset to give an output to a control relay when the counter module indicates a count equal to $1\frac{1}{2}$ times normal skew as a result of counterclockwise rotation of the pulse generator, for example, 25° from center. Preset module 2 is the same as preset module 1, except it gives an output when the pulse generator is at a predetermined number of degrees such as 17° counterclockwise rotation. Preset module 3 is set to give an output at 1°. This module is used in conjunction with preset module 2. When preset module 2 gives an output to begin correction of the skew, preset module 3 holds this correction until the platform is within 1° of perpendicular. Preset module 4 is the same as preset module 3, except it detects clockwise rotation of pulse generator. Preset module 5 is the same as preset module 2, except it detects clockwise rotation of the pulse generator. Preset module 6 is the same as preset module 1, except it detects clockwise rotation of the pulse generator. In summary, as the preset modules keep track of the information from the counter as to the amount and direction of a skew condition, one preset module will reach its set position and turn on, energizing one of the PM relays depending on which way the bridge platform is skewing. PM relays 3 and 4 provide the signal to the inverter drive that causes the drive to increase or decrease its frequency thus speeding up or slowing down a drive motor. This brings the platform back to within a predetermined value such as one degree of being perpendicular (90 degrees) to the rails that form a runway. PM relays 1 and 2 back up relays 3 and 4 in case of failure. These relays shut down the system and require the operator to check for the cause of the failure, and allows the operator to manually correct the skew. Power is received from a power supply S.

Distance pulse generator and counter are used to measure the distance traveled from the storage position of the platform out of a work area, this pulse generator is the same as the pulse generator used on the skew control. It is a quadrature type that transmits 1200 pulses per revolution of a wheel attached to the end truck. The counter wheel C (FIGS. 2, 4) rides on top of the rail thus causing it to rotate as the platform moves. The counter is a programmable bi-directional type counter. It can be programmed to count the feet of travel in relationship to the diameter of the pulse generator wheel. The bi-directional feature of the counter allows the operator to set the counter at zero when the platform is in the storage position. It will then count up to the amount of feet traveled away from the storage position and then back to zero as he returns to the storage position.

Although the invention has been shown in connection with an overhead underhung suspended crane, it is also applicable to other types of cranes such as cranes that have top-running end trucks and work along runways or tracks suspended overhead or along the ground for supporting loads such as hoists.

Figure 11:
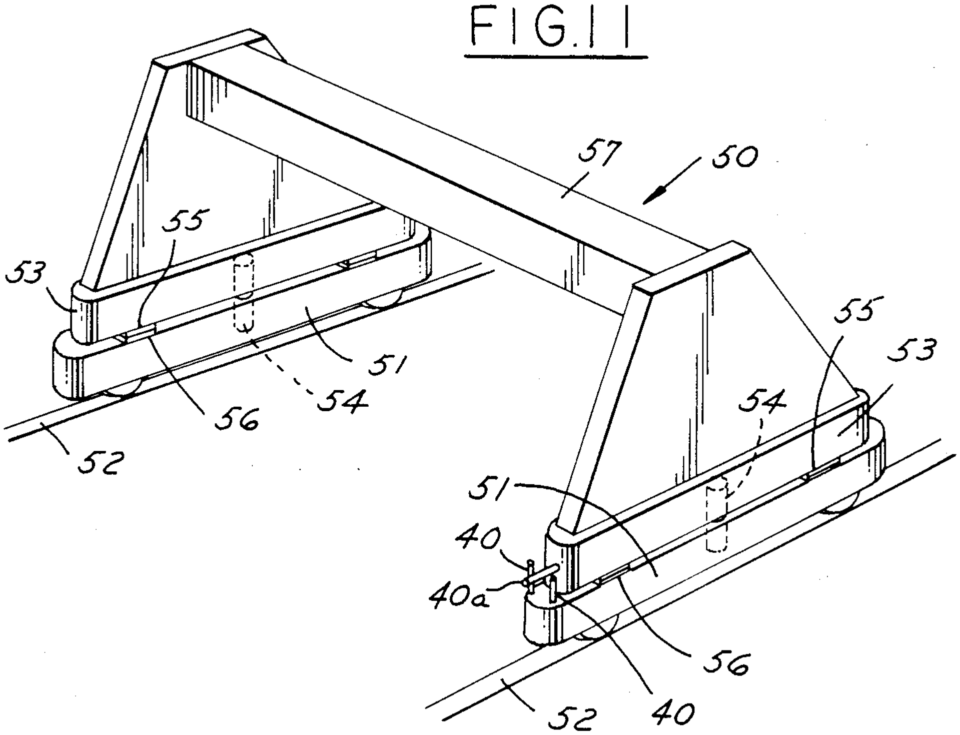
FIG. 11 is a perspective view of another form of crane embodying the invention.
Figure 12:
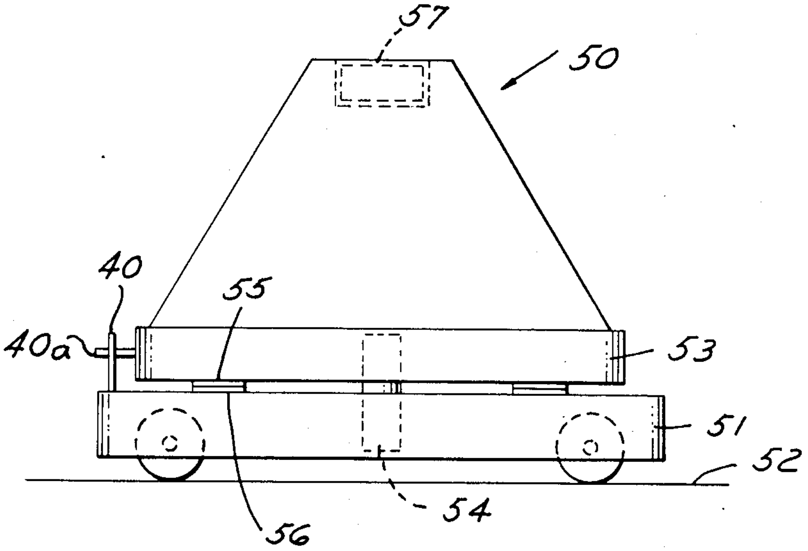
FIG. 12 is a side elevational view of the same.

Referring to FIGS. 11 and 12, the crane 50 comprises spaced trolleys 51 which run along tracks 52. Load bar 53 is pivoted to each trolley by a vertical kingpin 54. Bearing pads 55, 56 transmit the load from the load bars to the trolleys. Overhead platform 57 interconnects the two load bars from which work may be suspended.

As in the form previously noted, the anti-skewing device comprises an L-shaped bar 40 which functions in cooperation with a fork 40*a*. As skewing action occurs, a relative difference will occur between the load bar 53 and the trolleys 51 produces pulses which indicate the amount of skew.

What is claimed is:

1. A crane for use under a bridge which extends longitudinally and has transversely spaced rails on the underside, said crane comprising a platform adapted to be suspended below and extend transversely of the bridge, a suspension assembly adjacent each end of said platform, each suspension assembly comprising a pair of longitudinally spaced trolleys having wheels adapted to engage its respective rail, a motor associated with one set of trolleys of each suspension assembly for driving the respective suspension assembly along its respective rail, a first load bar interconnecting the pair of trolleys of each suspension assembly, a second load bar associated with each suspension assembly, means pivotally interconnected to the second load bar to the first load bar of each suspension assembly about a vertical axis, each suspension assembly also including longitudinally spaced vertical shaft having an upper end and a lower end, means pivoting the upper ends of said vertical shafts to the second load bar of the respective suspension assembly about a horizontal axis extending longitudinally of the suspension assembly, means pivoting the lower ends of said vertical shafts to the platform about a horizontal axis extending longitudinally of the respective suspension assemblies, means for sensing the relative angular skewing movement of the second load bar relative to the first load bar resulting from relative longitudinal movement between the suspension assemblies; and means for driving the motors in response to a predetermined relative angular skewing movement to eliminate the angular skewing movement.

2. The crane set forth in claim 1 wherein said drive means is of the tpye which is responsive to variations in frequency of electrical current to change the speed thereof.

3. The crane set forth in claim 1 wherein said means for sensing relative angular skewing movement comprises a first member mounted on said first load bar for pivotal rotation and a second member mounted on said second load bar adapted to engage said first member.

4. The crane set forth in claim 3 wherein said first member is L-shaped and includes a vertical portion mounted on said load bar for pivotal rotation and a second horizontal portion adapted to engage said second member.

5. The crane set forth in claim 4 wherein said second member comprises spaced vertical members between which said horizontal portion of said first member extends.

6. The crane set forth in claim 5 wherein said sensing means comprises a rotary pulse generator rotated by the vertical portion of the first member.

7. The crane set forth in claim 6 wherein said sensing means comprises an array of proximity switches along the path of said relative movement of said horizontal portion of said first member.

* * * * *